United States Patent
Venegas, Jr.

[19]

[11] Patent Number: 6,053,337
[45] Date of Patent: Apr. 25, 2000

[54] BIKE RACK

[76] Inventor: Frank Venegas, Jr., 5682 Lakeridge Dr., Brighton, Mich. 48116

[21] Appl. No.: 09/027,835

[22] Filed: Feb. 23, 1998

[51] Int. Cl.[7] ........................................................ A47F 7/00
[52] U.S. Cl. .................................................. 211/22; 211/20
[58] Field of Search .................................. 211/22, 20, 17, 211/189

[56] References Cited

U.S. PATENT DOCUMENTS

| | | | |
|---|---|---|---|
| 588,739 | 7/1897 | Brundage | 211/20 |
| 594,433 | 11/1897 | Sheldon | 211/20 |
| 3,841,119 | 10/1974 | Kaufman | 211/17 X |
| 3,887,075 | 6/1975 | Harvey | 211/22 X |
| 5,044,505 | 9/1991 | Spratt | 211/22 |
| 5,098,155 | 3/1992 | Graber | 211/22 X |
| 5,133,461 | 7/1992 | Martinell | 211/22 X |
| 5,377,849 | 1/1995 | Martin | 211/189 X |
| 5,624,103 | 4/1997 | Venegas, Jr. | 256/66 |
| 5,678,706 | 10/1997 | Husak et al. | 211/189 |

*Primary Examiner*—Daniel P. Stodola
*Assistant Examiner*—Erica B. Harris
*Attorney, Agent, or Firm*—Gifford, Krass, Groh, Sprinkle, Anderson & Citkowski, PC

[57] ABSTRACT

A knockdown bike rack assembly is formed of both metal and plastic. The bike rack assembly is readily and easily assembled and disassembled. The bike rack is maintenance free and requires no paint or other upkeep. The assembly of the present invention can be used in many applications both indoor and out. The bike rack assembly can readily be assembled anywhere. The assembly can also readily be disassembled to form a different bike rack structure configuration or to add more rails to the structure. Further, the bike rack assembly can be readily disassembled to change the plastic for the purpose of changing colors of the rail or adding/subtracting signage provided on the structure.

12 Claims, 1 Drawing Sheet

BIKE RACK

BACKGROUND OF THE INVENTION

1. Field of the Invention

The present invention is directed to a knock down bike rack assembly. More particularly, the present invention relates to a unique knock down bike rack assembly having protective coverage for use outdoors.

2. Description of the Relevant Art

The typical bike rack is formed of metal and susceptible to effects of weather or other environmental conditions causing the rack to rust and deteriorate. A disadvantage of these metal bike racks is that such racks require regular upkeep such as painting to prevent rust or complete replacement when the metal rusts away.

To overcome this, galvanized steel has been used to avoid rust and hopefully, eliminate regular upkeep. However, a disadvantage of both metal and galvanized steel bike racks is that their assembly is of a permanent nature. That is, once the bike rack is assembled, the bike rack is permanently fixed at that location in that configuration.

SUMMARY OF THE INVENTION

The present invention provides a knock down bike rack assembly that is formed of both metal and plastic. The bike rack is readily and easily assembled and disassembled. The bike rack is maintenance free and requires no paint or other upkeep.

The bike rack of the present invention can be used in many applications. The bike rack assembly can be assembled anywhere. The assembly can also be readily disassembled to form a different bike rack structure configuration or to make additions to the original structure. Further, the bike rack can be readily disassembled to change the plastic for the purpose of changing colors of the bike rack or adding/subtracting signage provided on the bike rack. This is advantageous when using the invention in a public setting.

The knock down bike rack assembly of the present invention includes two spaced apart vertical rails and a base support for supporting the vertical rails in an upright position. Alternatively, the vertical rails may be supported by the ground using standard coring procedures.

Two spaced apart horizontal rails are provided and removably engage with the vertical rails. These horizontal rails are preferably positioned above the base supports. Each vertical and horizontal rail is surrounded by removable and replaceable polymerized sheathing. The polymerized sheathing has an interior diameter equal to or greater than the outer diameter of each rail. Slip-on structural fittings are provided to removably engage the horizontal rails to the vertical rails.

Between the spaced apart horizontal rails are a series of vertical rails spaced intermittently for supporting the width of a bicycle tire. Each of these intermittent rails is also surrounded by removable and replaceable polymerized sheathing.

In addition, a separate horizontal rail is engaged to the base a distance from the two spaced apart horizontal rails and extending between the upright vertical rails. The span between this horizontal rail and the two spaced apart horizontal rails is provided to support a portion of the outer radius of a bike tire. The purpose of the additional horizontal rail and the series of vertical rails is to provide support for a front or back tire of a bike within the bike rack assembly. Further, the bike may be locked to any portion of the assembly that is provided herewith. The third horizontal rail, like all other rails of the invention, is surrounded by removable and replaceable polymerized sheathing.

Each rail of the knockdown bike rack assembly of the present invention is removable, replaceable, and interchangeable with other rails within the assembly or additional rails provided for amending the bike rack assembly. Further, each rail is surrounded by a removable and replaceable polymerized sheathing. The sheathing may be provided in any color and may support advertising, warning signs or other important information as required. These and other objects, advantages and features of this invention will become apparent upon review of the following specification in conjunction with the drawings.

DETAILED DESCRIPTION OF THE PREFERRED EMBODIMENTS

Figure 1:
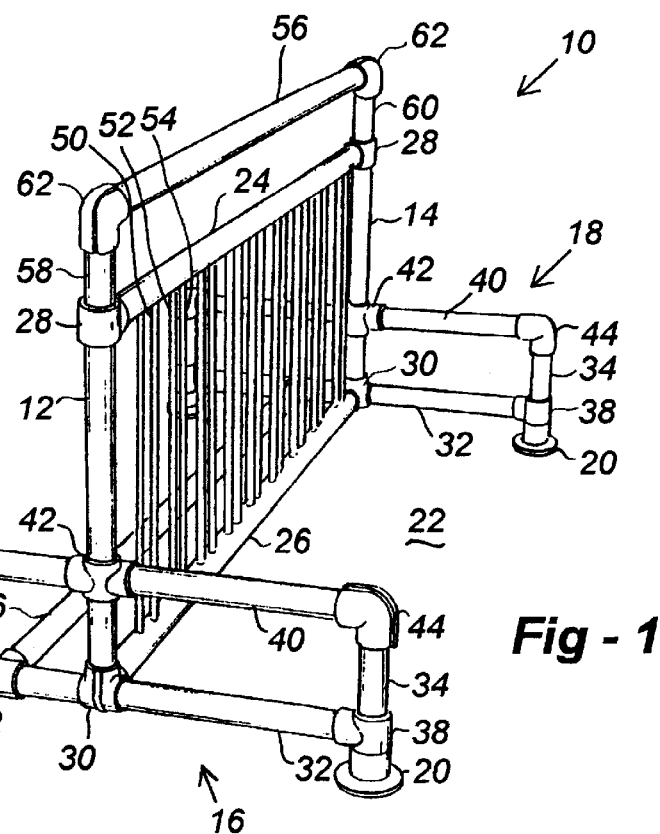
FIG. 1 is a perspective view of a knock down bike rack assembly of the present invention.
Figure 2:
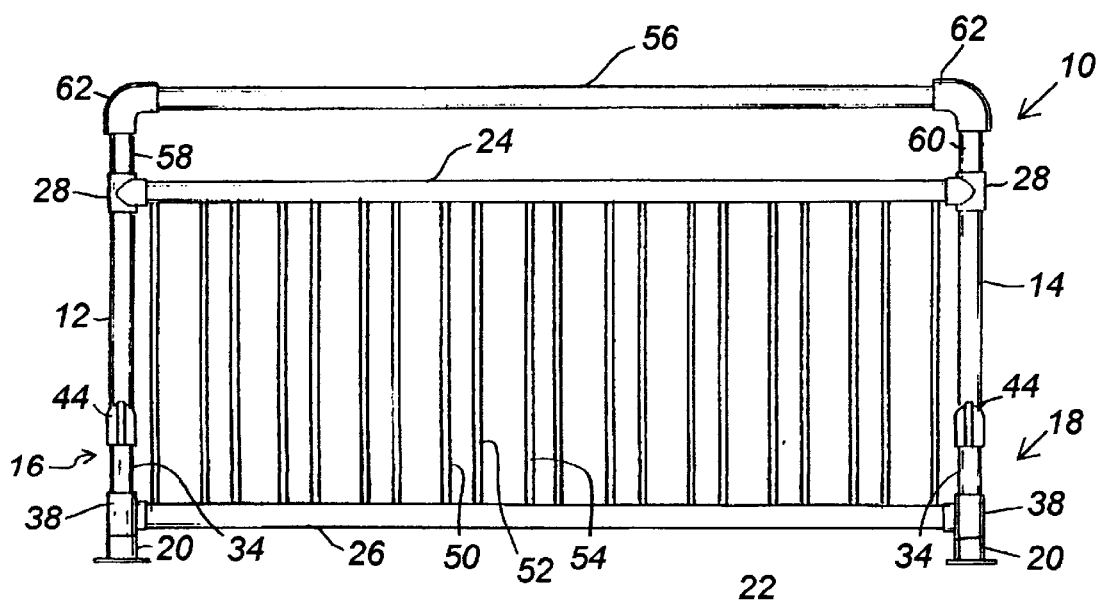
FIG. 2 is a front view of a preferred embodiment of the present invention.

With reference to FIGS. 1 and 2, a knock down bike rack assembly 10 is there shown. In this first preferred embodiment, two spaced apart vertical rails 12, 14 are provided and supported in an upright position by a base 16, 18. Base 16, 18 provides removable and replaceable support 20 to the ground 22. Alternatively, the knock down bike rack assembly 10 can be cored to the ground 22 for support.

Knock down bike rack assembly 10 of the present invention also includes two spaced apart horizontal rails 24, 26 extending between spaced apart vertical rails 12, 14. Horizontal rail 24 is preferably located above base 16, 18 and is removably and replaceably secured to vertical rails 12, 14 by releasable supports 28. A second set of releasable supports 30 support horizontal rail 26 to vertical rails 12, 14 and base 16, 18.

With reference to FIG. 1, base 16 is preferably identical in structure to base 18 and is described below. Base 16 is generally comprised of a horizontal rail 32 extending perpendicular to horizontal rail 26. Horizontal rail 32 is removably and replaceably attached to horizontal rail 26 and vertical rails 12, 14 by releasable supports 30. Base 16, 18 further includes a set of spaced apart vertical rails 34, 36 that are preferably releasably secured at opposite ends of horizontal rail 32 for supporting horizontal rail 32 to the ground 22 by removable and replaceable supports 38 via removable and replaceable support 20.

A second horizontal rail 40 may be provided above horizontal rail 32 for additional support by base 16, 18 to upright vertical rails 12, 14. Horizontal rail 40 preferably extends parallel to horizontal rail 32 a distance above horizontal rail 32 and is removably attached to vertical rails 12, 14 by removable and replaceable supports 42. Additionally, second horizontal rail 40 is removably attached to vertical rails 34, 36 by removable and replaceable supports 44.

Horizontal rail 46 is releasably engaged to base 16, 18 by removable and replaceable supports 48. Horizontal rail 46 is provided for supporting a bike within the bike rack assembly 10. Horizontal rail 46 is spaced apart from vertical rails 12, 14 a distance to support a portion of the outer radius of a bike tire.

A series of vertical rails, referred by way of example as 50, 52, 54 are provided between horizontal rails 24, 26. These series of vertical rails 50, 52, 54 are supported by horizontal rails 24, 26 at each end and are spaced apart a distance to support the width of a bike tire.

An additional horizontal rail 56 may be provided for structural support of the knockdown bike rack assembly 10 by extending vertical rails 12, 14 above releasable supports 28 using additional vertical rails 58 and 60. Horizontal rail 56 is removably and releasably supported to additional vertical rails 58, 60 by releasable supports 62.

Figure 3:
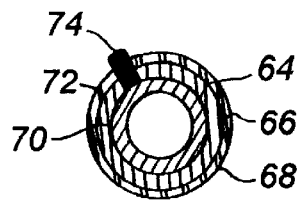
FIG. 3 is a cross-sectional view of a typical rail with sheathing and a removable support.

With reference to FIG. 3, a typical rail 64 is there shown surrounded by polymerized sheathing 66 and removable replaceable support 68. Typically, each horizontal and vertical rail of the knock down bike rack assembly 10, as represented by rail 64 in FIG. 3, is surrounded by protective polymerized sheathing 66. Polymerized sheathing 66 is removable and replaceable and preferably slip fits about each rail 64. Sheathing 66 preferably has an interior diameter 70 equal to or greater than the exterior diameter of rail 64. Polymerized sheathing 66 may be provided in any color and also include signage such as advertisement or warnings. Since polymerized sheathing 66 is slip fit about rail 64, sheathing 66 may be removed and replaced if damaged or if a color change or verbiage change is required.

Additionally as shown in FIG. 3 by way of example, releasable and removable support 68 slip fits about polymerized sheathing 66. In a preferred embodiment, interior diameter 72 of releasable and removable support 68 is equal to or greater than the exterior diameter of polymerized sheathing 66. This typical structure shown and described with reference to FIG. 3 applies to all horizontal and vertical rails of the present invention including the series of vertical rails represented by rails 50, 52, 54.

Removable and replaceable supports 20, 28, 30, 38, 42, 44, 48 and 62 are provided to removably engage horizontal rails to vertical rails of the present invention. These supports are preferably Hollaender structural fittings manufactured by the Hollaender Manufacturing Company, Cincinnati, Ohio. T-shaped structural fittings 28, 38, 48 may be provided as removable supports to join corresponding horizontal and vertical rails. These T-shaped structural fittings removably engage horizontal rails to vertical rails through polymerized sheathing by set screw 74 as shown in FIG. 3.

L-shaped Hollaender slip-on structural fittings 44, 62 also removably engage horizontal rails to vertical rails through polymerized sheathing by set screw 74 as typically shown in FIG. 3. Additionally, slip-on structural fittings may be provided in an X shape as shown at 42 or a multi-armed shape as shown at 30. Each of these slip-on structural fittings is secured by set screw 74 to typical rail 64 through polymerized sheathing 66.

In a second preferred embodiment of the present invention, an additional horizontal rail may be provided parallel to horizontal rail 46 and horizontal rail 26 along opposite sides of vertical rails 12, 14 and removably supported by base 16, 18.

This additional rail (not shown) allows support for a bike tire along both sides of the bike rack assembly 10.

Alternative embodiments of the present invention may involve the use of additional horizontal and vertical rails to create an extended bike rack assembly 10. It is envisioned that each vertical rail will be removably supported to additional horizontal rails by removable and replaceable supports. Further, each rail will be surrounded by polymerized sheathing typically shown at 66 in FIG. 3. Moreover, each additional horizontal rail and vertical rail will be preferably supported to each other by Hollaender slip-on structural fittings conforming to any shape necessary to create the overall structural shape of the knock down bike rack assembly of the present invention. That is, the bike rail assembly of the present invention may extend linearly, triangularly, circularly, or any other shape that may be reasonably configured. Moreover, each rail, vertical and horizontal, shall preferably be surrounded by polymerized sheathing having an interior diameter that is equal to or greater than the exterior diameter of the corresponding rail.

The above description is considered that of the preferred embodiment only. Modifications of the invention may occur to those of ordinary skill in the art. Therefore, it is understood that the embodiments shown in the drawing and described above are merely for illustrative purposes and are not intended to limit the scope of the invention.

I claim:

1. A knock down bike rack assembly comprising:

two spaced apart vertical rails each having an outer diameter and a length;

replaceable polymerized sheathing surrounding each of said spaced apart vertical rails, said sheathing having an inner diameter equal to or greater than the outer diameter of said spaced apart vertical rails, said sheathing extending the entire length of said spaced apart vertical rails;

means for supporting said spaced apart vertical rails in an upright position;

two spaced apart horizontal rails extending between said spaced apart vertical rails and releasably engaged to said spaced apart vertical rails, each of said horizontal rails having an outer diameter and a length;

replaceable polymerized sheathing surrounding each of said spaced apart horizontal rails, said sheathing having an inner diameter equal to or greater than the outer diameter of said spaced apart horizontal rails, said sheathing extending the entire length of said spaced apart horizontal rails;

means for supporting a bike within said bike rack assembly, said means comprising a plurality of inner vertical rails extending between said spaced apart horizontal rails said inner vertical rails being spaced apart a distance to support the width of a bike tire, said inner vertical rails having an outer diameter less than said outer diameter of said horizontal rails, said inner vertical rails having a length; and replaceable polymerized sheathing surrounding each of said inner vertical rails, said sheathing having an inner diameter equal to or greater than the outer diameter of said inner vertical rails and extending the entire length of said rails.

2. The invention as defined in claim 1, wherein said horizontal rails are spaced apart from each other by a distance to support a portion of the outer diameter of a bike tire.

3. The invention as defined in claim 1, further comprising means for releasably engaging said two spaced apart horizontal rails to said two spaced apart vertical rails, said engaging means comprising a T-shaped member formed of polymerized sheathing and having a hollow interior;

wherein one leg of said T-shaped member has an interior profile identical to the exterior profile of said two spaced apart horizontal rails and the remaining two legs of said I-shaped member each have an interior profile identical to the exterior profile of said spaced apart vertical rails; said interior profiles having a diameter equal to or greater than the exterior diameters of said polymerized sheathing surrounding each of said two spaced apart horizontal rails and said spaced apart vertical rails.

4. The invention as defined in claim 1, further comprising means for releasably engaging said two spaced apart horizontal rails to said two spaced apart vertical rails, said engaging means comprising a multi-angled member formed of polymerized sheathing and having a hollow interior;

wherein one leg of said multi-angled member has an interior profile identical to the exterior profile of said two spaced apart horizontal rails and another leg of said multi-angled member having an interior profile identical to the exterior profile of said spaced apart vertical rails; said interior profiles having a diameter equal to or greater than the exterior diameters of said polymerized sheathing surrounding each of said two spaced apart horizontal rails and said spaced apart vertical rails.

5. The invention as defined in claim 1, said means for supporting said spaced apart vertical rails in an upright position comprising a base having releasable means and extending from one end of each of said spaced apart vertical rails for removable attachment to a foundation such as the ground.

6. The invention as defined in claim 5, further comprising polymerized sheathing surrounding said base.

7. The invention as defined in claim 6, wherein said releasable means comprises means for releasably engaging said two spaced apart vertical rails to said base comprising a cross-shaped member formed of polymerized sheathing and having a hollow interior;

wherein one leg of said cross-shaped member has an interior profile identical to the exterior profile of said two spaced apart vertical rails and another leg of said cross-shaped member having an interior profile identical to the exterior profile of said base; said interior profiles having a diameter equal to or greater than the exterior diameters of said polymerized sheathing surrounding each of said two spaced apart vertical rails and said base.

8. The invention as defined in claim 6, wherein said releasable means comprises means for releasably engaging said two spaced apart vertical rails to said base comprising an X-shaped member formed of polymerized sheathing and having a hollow interior;

wherein one leg of said X-shaped member has an interior profile identical to the exterior profile of said two spaced apart vertical rails and another leg of said X-shaped member having an interior profile identical to the exterior profile of said base; said interior profiles having a diameter equal to or greater than the exterior diameters of said polymerized sheathing surrounding each of said two spaced apart vertical rails and said base.

9. The invention as defined in claim 5, said base comprising a horizontal base rail extending perpendicular to said one end of each of said spaced apart vertical rails and a second set of spaced apart vertical base rails extending perpendicular from each of said horizontal base rails toward said foundation.

10. The invention as defined in claim 9 wherein said base is releasably engaged to said two spaced apart vertical rails and to one of said two spaced apart horizontal rails.

11. The invention as defined in claim 9, further comprising polymerized sheathing surrounding each of said vertical base rails and said horizontal base rails.

12. The invention as defined in claim 11, wherein said releasable means comprises means for releasably engaging said two spaced apart vertical base rails to said horizontal base rail comprising an L-shaped member formed of polymerized sheathing and having a hollow interior;

wherein one leg of said L-shaped member has an interior profile identical to the exterior profile of said two spaced apart vertical base rails and another leg of said L-shaped member having an interior profile identical to the exterior profile of said horizontal base rail; said interior profiles having a diameter equal to or greater than the exterior diameters of said polymerized sheathing surrounding each of said two spaced apart vertical base rails and said horizontal base rail.

* * * * *